J. CARBÓ.
CORN HARVESTING AND HUSKING MACHINE.
APPLICATION FILED JULY 2, 1917.

1,315,465.

Patented Sept. 9, 1919.
8 SHEETS—SHEET 2.

Inventor
José Carbó,

Attorney

J. CARBÓ.
CORN HARVESTING AND HUSKING MACHINE.
APPLICATION FILED JULY 2, 1917.

1,315,465.

Patented Sept. 9, 1919.
8 SHEETS—SHEET 8.

Inventor
Jose' Carbó,

Attorney

UNITED STATES PATENT OFFICE.

JOSÉ CARBÓ, OF ROSARIO DE SANTA FE, ARGENTINA.

CORN HARVESTING AND HUSKING MACHINE.

1,315,465.  Specification of Letters Patent.  Patented Sept. 9, 1919.

Application filed July 2, 1917. Serial No. 178,154.

*To all whom it may concern:*

Be it known that I, JOSÉ CARBÓ, subject of the King of Spain, residing at No. 1441 Salta street, Rosario de Santa Fe, Argentina, have invented certain new and useful Improvements in Corn Harvesting and Husking Machines, of which the following is a specification.

The present invention relates to a corn harvesting and husking machine and has for its object to provide a machine of the said kind adapted for performing simultaneously and in a more efficient and thorough manner than heretofore, the operations of harvesting, husking and cleaning the cobs, all of which has not been effected at one time by a single machine of any of the known types.

The present invention also has for its object to provide a machine of simple construction, easy to handle and offering no difficulties as to the understanding of its operation, a condition which has proven to be a serious objection in connection with the known machines, as it is not always possible to obtain skilled operators for attending to such machines and in most cases the laborers ordinarily employed for harvesting are also utilized for the above purpose.

A further object of this invention is to provide a machine adapted to operate by its own forward motion and to be governed in a simple and speedy manner with regard to its drive and to the direction thereof.

Another object of the invention is to provide in a machine of the above description, suitable means for always keeping in a clean condition the stripping or husking rollers and for preventing the cobs, after their separation from the respective stalks, from being dropped in different directions, but on the contrary to oblige the cobs to fall all on a suitable cob elevator or conveyer which conveys the cobs to a platform provided in the machine, where the same are cleaned and placed in bags or baskets, as may be desired, all in a convenient and substantially automatic manner, so that only a most limited number of operators are required for performing the work.

Another object of the invention is to provide in machines of the above kind, suitable means for cleaning the husked cobs from dust or other foreign matter and for simultaneously gathering the grains of maize which during the operations may have been detached from the cobs.

Other objects viewed by this invention will appear in the course of this specification and will particularly be referred to in the claims, hereto appended and which may be considered as an abridgment of the essential features of the invention.

Although in the description and drawings reference has been made to a particular type of machine, it will be evident that the arrangement of parts as well as the minor details of construction of the same are capable of being modified in several respects, without, however, departing from the essential features of the invention which, as before stated, have clearly been pointed out in the final claims.

In the accompanying drawings, A indicates the inlet opening or entrance for the maize plants which are fed by the paddles C, C'' toward the inner casing B at the bottom of which are mounted two stripping or husking rollers D, each provided at its lower end with a conical snail shaped thread G. At one of the side walls B of the casing at whose bottom are mounted the said husking rollers, are provided means for cleaning these rollers which consist of an endless chain to which are secured the cleaning paddles E, adapted to drag on the surface of said rollers, being shaped in such a way that their lower edges will fit with the whole outer contour of the said husking rollers. F is an open space in the above mentioned side wall B which allows of the movement of the said cleaning paddles while affording at the same time passage for the cobs which after being detached from their respective stalks, fall through said space onto a cob elevator or conveyer which carries the husked cobs to the cleaning and bagging devices, situated at the rear end of the machine.

In order that the invention may be readily understood and carried into practice without difficulties, a preferred embodiment of the same has been shown by way of example in the said drawings, in which:

Figure 1 is a perspective view, partially in section and diagrammatic, showing the part of the machine destined to detach and husk the maize cobs.

Fig. 2 is a plan view of the part of the machine in which, for the sake of clearness, part of the draft beam and the steering wheel have been omitted.

Fig. 3 is a plan view of the part of the machine corresponding to the draft beam and steering wheel.

Fig. 8 is a fragmentary view of the side of the feed end or entrance opposite to that shown in Fig. 4.

Fig. 9 is a view of the driven husking roller.

Fig. 10 is a similar view of the driving husking roller.

In all the different views of the drawings, the same numbers of reference have been used to indicate like or corresponding parts.

The whole machine is mounted on an underframing 1 of metal, cast or formed otherwise, provided with the necessary stay bars 5 and a metallic frame adapted to give to the entire structure a suitable degree of incline with regard to the soil on which it is to operate. The framing 1 is mounted on a U-shaped axle 4, having secured to one of its ends the driving wheel 2, preferably provided with suitable gripping devices for preventing the wheel from skidding, while on the other end of the said axle is mounted the wheel 3 which simply serves to support the apparatus.

Figure 11:
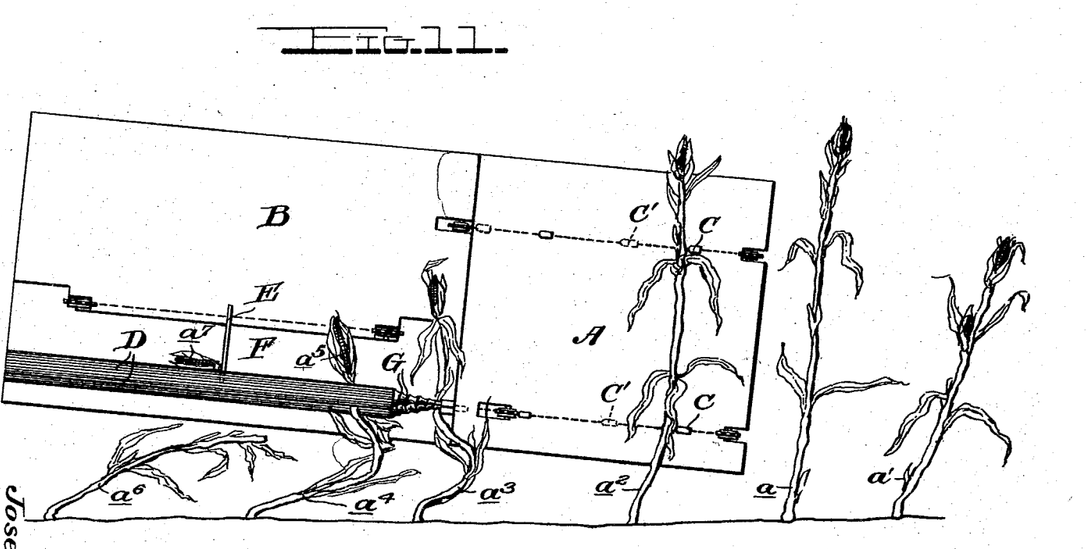
Fig. 11 illustrates a diagrammatical view of the whole machine which clearly shows the manner of operating of the same, some of its parts having been omitted so as to obtain a full view of the main parts of the machine.

Along the apparatus and longitudinally with regard thereto, are mounted the wall plates B, arranged to form a sort of hopper, widest at the top and at whose bottom are mounted the stripping and husking rollers 69, indicated at D in Figs. 1 and 11. Said hopper B is open at its lower end and such opening coincides with a cut away part of the underframing 1, so that the said hopper B directly communicates at its lower end with the space above the soil, excepting the obstruction formed by the two husking rollers.

At the fore end or front of the hopper B are arranged the guide walls 6 (indicated by the letter A in the diagrammatical views), which form a sort of entrance to the hopper and serve to gather within a space equal in width to its maximum opening, the maize plants met with by the machine as it travels along the row and guide the same toward the lower end of the husking rollers 69 in a manner hereinafter to be explained.

The husking rollers are of suitable diameter and are provided with longitudinal flutes or grooves throughout their length. The lower end of each of the said rollers forms a conical extension 70, provided with a snail shaped thread, the threads of the two cones being of opposite direction, and on the vertex of each cone is formed a cylindrical trunnion or pivot 71 by means of which the rollers are rotatably mounted in bearings provided to that end in the parts 6. At their upper ends and at the same level, both husking rollers are formed with collars or plain circumferential grooves 68, arranged to rotate in bearings and also have rigidly connected to them pinions or cog wheels 67 and 72 which mesh with each other, so that both rollers, when one of the same is driven by the pinion 64, will rotate in opposite directions. The roller 69, provided with the driving pinion 64, is also formed with a second collar, mounted to rotate in another bearing and carries besides a heavy fly wheel 66 to facilitate its operation. The manner of transferring motion from the driving wheel 2 of the machine to the said pinion 64 will be explained later.

On the said driving wheel 2 is mounted a gear 48 which meshes with a cog wheel 47 keyed to the end of a cross shaft 46 supported in suitable bearings on the underframe 1 of the machine. Said shaft 46 has splined on it a friction clutch cone 39 provided with a grooved hub 40 and on the same shaft is freely mounted a sleeve which carries the cog wheel 38 and the sprockets 37 and 83. By means of the fork 41 and the crank lever 42, operated by a hand lever 44 provided with the connecting rod 43, the friction clutch cone 39 may be coupled and uncoupled, so that motion will thereby be transferred or not from the driving wheel 2 to the remainder of the machine. The hand lever 44 is mounted to engage with a toothed sector 45 by means of which it may be locked in any position desired.

The friction clutch being in its coupled position, motion is transferred from the cog wheel 38 to the cog wheel 62, in mesh therewith and mounted on a cross shaft 61 supported in suitable bearings on the underframe 1 and provided on its opposite end with a bevel pinion 60 for a purpose hereinafter to be explained. On the same shaft 61 is mounted the bevel gear wheel 63 which engages with the bevel pinion 64 of one of the husking rollers, in the manner above set forth, whereby motion is transmitted from the driving wheel 2 to the husking rollers 69.

At the same time, the pinion 60 meshes with the pinion 59, mounted on the end of a longitudinal shaft 58, supported in suitable bearings and carrying on its opposite end another pinion 57. As may be seen in Fig. 8, said pinion 57 meshes with the pinion 56 mounted on a vertical shaft 54, supported in bearings. This vertical shaft carries at its upper end the sprocket 53 and at its lower end the sprocket 49 which respectively engage, through the chains 11, situated at the feed opening 6 of the machine, with the sprockets 50, 52, fixed to the shaft 51, mounted in suitable bearings. By means of this arrangement, each side of the feed end or entrance 6 is provided with two sets of chains which move toward the center of the apparatus and said chains are provided with arms or paddles, in a manner similar to that which will now be explained in connection with the other side of the inlet opening or feed end 6.

The sprocket 37, also mounted on the freely rotating sleeve of the shaft 46, transfers motion by means of a chain to a sprocket 36 placed on one end of the cross shaft 35, provided on its opposite end with a pinion 34 in mesh with a cog wheel 33, keyed in turn to a vertical shaft 333 which carries a sprocket 32. This latter sprocket, together with another sprocket 29, mounted on a vertical shaft 28, are arranged to drive a chain 30 provided at intervals with paddles 31 (indicated at E in Fig. 1) adapted to move or drag on the surface of the rollers 69, in a direction parallel to their longitudinal axes, so that the said paddles will clean the surface of the rollers and will at the same time carry away therefrom any cobs which might be caught thereon, causing them to travel toward the upper part, to the wall B'. The wall B' is arranged on an arc of a circle, with its center situated at the shaft of the sprocket 32, so that in case any cob should remain on the upper part of the husking rollers, it will be pushed toward the cob elevator by the cleaning paddles 31, as will be readily understood when inspecting the drawings. In order to keep the chain 30 under due tension, one or more guide wheels have been arranged at suitable places, as indicated in Fig. 2.

Motion of the chain 30 takes place in a direction toward the bottom of the hopper, so that the paddles 31 will clean the rollers throughout the extension of their fluted or grooved part, from the base of the cones 70 to a point near the grooves 68.

To the upper end of the shaft 28 is keyed a sprocket 26 which by means of a chain and another guide sprocket 27 drives a sprocket 25 mounted on a substantially vertical shaft 24, supported in bearings 14. Said shaft 24 also carries a sprocket 13 which by means of the upper chain 11 drives the sprocket 15, mounted on the vertical shaft 20 supported in bearings 16. In order to keep under due tension the chain 11 which connects the sprockets 13 and 15, a third sprocket wheel 17 is mounted on a stud 18 so as to be able to shift thereon, in a manner well known in the art. The sprocket 13 transfers its motion through the shaft 20 and sprocket 21 to the sprocket 22, by means of the lower chain 11. The sprocket 22 is mounted in bearings 23 in such a way that its tension may conveniently be adjusted. In a similar manner are arranged at the opposite side of the entrance or feed opening, the tension wheels for the purpose of regulating the tension of the chains 11, provided with the paddles or arms 7, (indicated at C in Fig. 1) in a manner now to be explained.

In the wall plate of the inlet opening or entrance A are arranged the openings 19 for allowing of the passage of the chains 11, together with the guide paddles or feed arms 7, mounted to operate as follows: The feed arms or paddles 7 are channel shaped and provided at their bases with flanges 8 (see Fig. 8) which slide in guide races formed by metallic pieces 12, suitably fixed to the walls of the inlet end. The chains 11 move within said races and the feed arms 7 are secured thereto with the aid of intermediary pieces 10, provided with pivotes 9 on which the said feed arms are adapted to swing. Owing to this arrangement, at the instant when the plant is seized by the rollers, said arms or paddles are set free and swing down on the chains, but when again entering the feeding inlet or entrance, the arms swing out and their flanges 8 will be obliged to enter into the races 12, thereby maintaining themselves perpendicular to the said feed inlet and carrying along with them the maize plants met with during their travel. The paddles or arms 7 alternate in position on both sides of the apparatus, so that as the plants are set free by one of them, another paddle of the opposite side will catch the plants, till the said plants are deposited on the lower part 70 of the husking rollers.

On the side of the machine corresponding to the cleaning devices 31 and parallel to the husking rollers 69 is arranged a cob elevator or conveyer. Said elevator substantially comprises a framing of metal or wood, 74, suitably inclined, on whose surface move two endless chains 75 provided at convenient intervals with slats 76, of wood or similar material. At the end corresponding to the husking rollers, is placed, at a level lower than that of the said rollers, the receiving end of the elevator and a chute 73 has been provided for the purpose of leading the husked cobs to the bottom of the elevator. The chute 73 is placed at the open part F of one of the side walls B of the hopper. Motion is transferred to the cob elevator in the following manner:

The sprocket 83 mounted on the freely rotating sleeve of the cross shaft 46, transfers motion by means of a chain 82 to another sprocket 81, mounted on the end of a cross shaft 80 supported in suitable bearings near the upper end of the cob elevator. To said shaft 80 are keyed the sprockets 79 which drive the chains 75 of the elevator in a direction toward the top of the apparatus. At the lower end of the elevator is arranged a similar set of sprockets 78, also in mesh with the said chain 75. Below the cob elevator is arranged a suitable plate 77 which prevents the chains from descending too far toward the soil and further prevents any maize plants which may have been left there, from interfering with the operation of the machine.

Figures 12, 13:
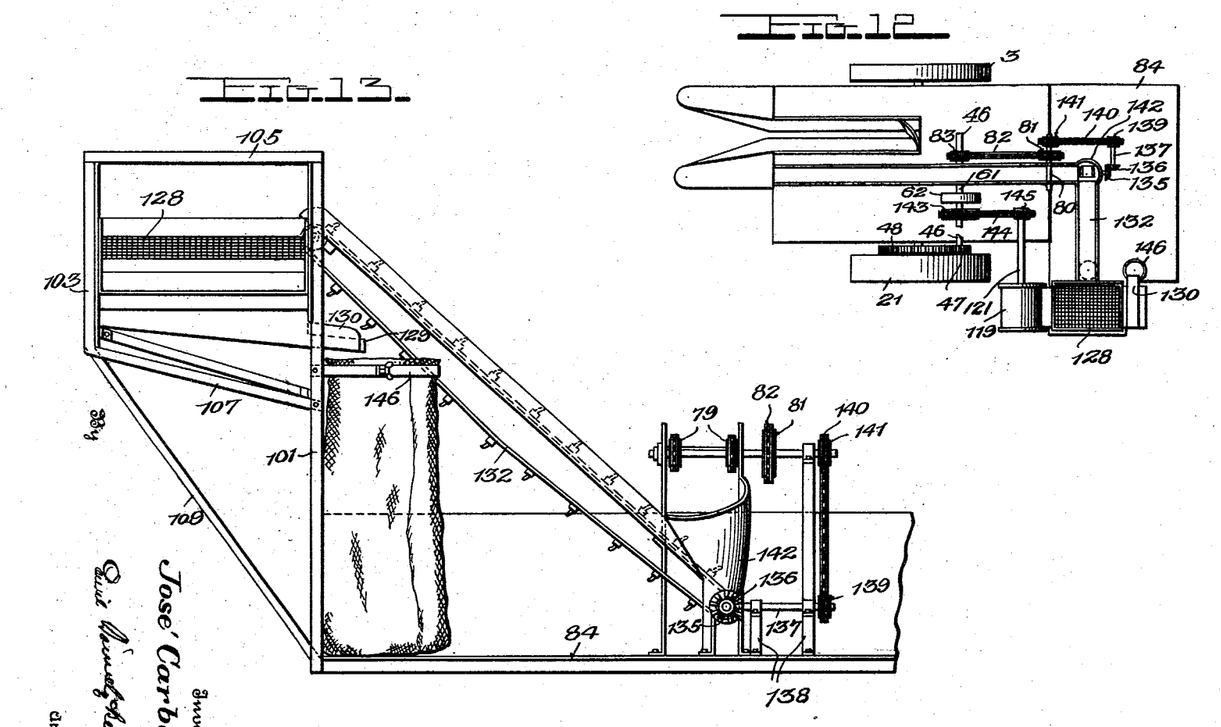
Fig. 12 is a top plan view of the machine, with the cleaning, separating and bagging devices attached to its rear end.
Fig. 13 is a side elevation of the cleaning, separating and bagging devices, drawn to a larger scale.
Figure 14:
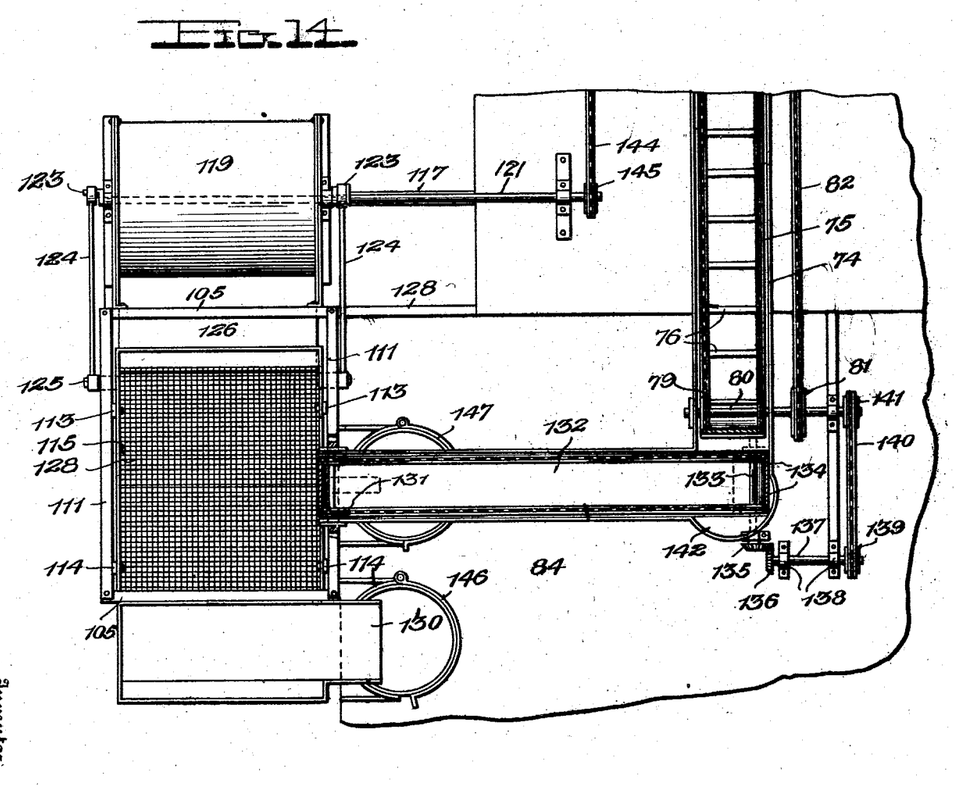
Fig. 14 illustrates a top plan view of the same.
Figures 15, 16:
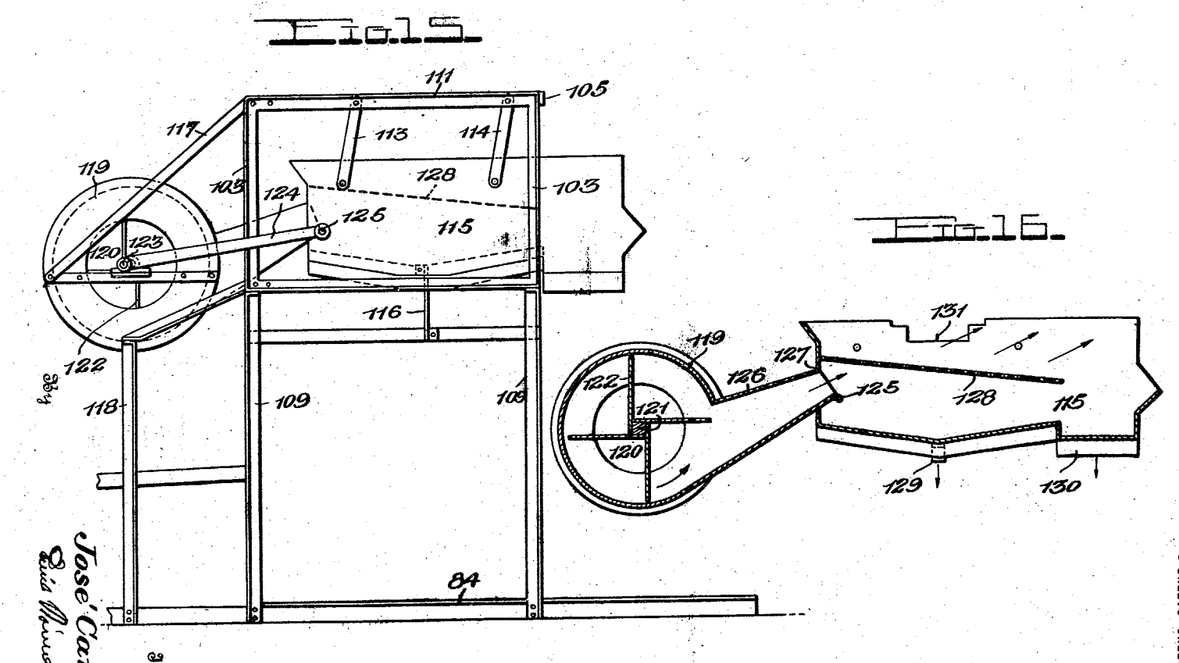
Fig. 15 is a side elevation of the cleaning and separating device.
Fig. 16 shows a longitudinal section of the blower casing and of the oscillating box of the cleaning and separating device.

To the rear of the elevator and flush with the lower part of the framing 1, is arranged a platform 84, extending rearward and laterally and carrying at its edge two parallel uprights 101 which together with two uprights 103, also parallel, form a framing, being connected together at the top by means of the cross stays 105. Two inclined bars 107 connect the lower ends of the uprights 103 to those of the uprights 101. In order to still further reinforce this framing, two inclined stay bars 109 connect the lower end of the short uprights 103 to the framing or platform 84. By means of angle iron bars 111 this structure is completed in the manner shown in the figures 13 and 15 of the drawings. To the upper side bars 111 are pivotally connected the links 113 and 114 which support a box or trough 115, of particular shape, hereinafter to be described. Said box is also connected at the outer side of its bottom by means of a link 116 to the opposite cross stay in such a manner that the said box will be allowed a certain rectilinear reciprocating motion. By means of the bars 117 and 118, a fan or blower casing 119 is supported on the framing 84; the casing 119 is open at 120 at both ends and on a shaft 121 which extends through the casing and in the interior of this latter, are mounted the paddles 122. At the ends of the casing 119 and on the aforementioned shaft 121 are mounted a pair of crank pins 123 to each of which is connected one end of a pitman 124, pivoted at its other end at 125 to the said box 115. The casing 119 communicates by means of a duct 126 with an opening 127, formed at the rear side of the oscillating box 115 and below an inclined screen 128 placed within the box and stopping short before the wall of the box opposite to the entrance of the duct. Below the screen 128, the box 115 is hopper shaped and from its lowest point issues a duct or pipe 129 which serves to discharge the loose grains, as will later be explained. That part of the box 115 which extends beyond the screen, also resembles a hopper in shape and serves to discharge, by means of a duct or channel 130, the clean cobs.

The maize cobs are conveyed to the oscillating box by means of an elevator of any suitable construction, resting with its upper end on the side of the box 115 at 131, and with its lower end on the outlet or discharge end of the conveyer or elevator 75. The said elevator, indicated by the reference number 132, receives motion at its lower end from an axle 133 provided with the sprockets 134 and carrying on its outer end a pinion 135 in gear with another pinion 136 mounted on the end of a shaft 137, arranged to rotate in bearings 138 mounted on the platform 84. On the other end of the said shaft 137 is secured a sprocket 139 which by means of a chain drive 140 receives motion from another sprocket 141 keyed to the outer end of the shaft 80; this latter shaft carries the sprockets 79 of the conveyer and is driven by means of a sprocket 81 and chain 82 from the sprocket 83 mounted on the driving sleeve that is carried by the shaft 46. The cobs conveyed by the conveyer or elevator 75 are led to the elevator 132 by means of a chute 142.

The blower and the pitmen 124 are operated from the shaft 61 which is itself driven from shaft 46, by means of a sprocket 143 mounted on said shaft 61, and the chain 144 passing from said sprocket to another sprocket 145, keyed to the shaft 121 which carries the crank pins that operate the pitmen.

On the side of the framing which supports the oscillating box 115 are arranged the supporting hoops 147, destined to respectively support the bags for the cobs and the loose grains, discharged into said bags from the channels 129 and 130, respectively. Said bag supporting hoops will of course be placed so that they will coincide in position with the said discharge channels.

The draft mechanism of the machine is arranged at one side of the underframe 1, away from the axis of the same and substantially consists of a metallic bar 85, provided with a series of holes which permit of regulating the traction. Said bar is connected by means of a stay rod 86 to one of the sides of the said underframe.

Figure 4:
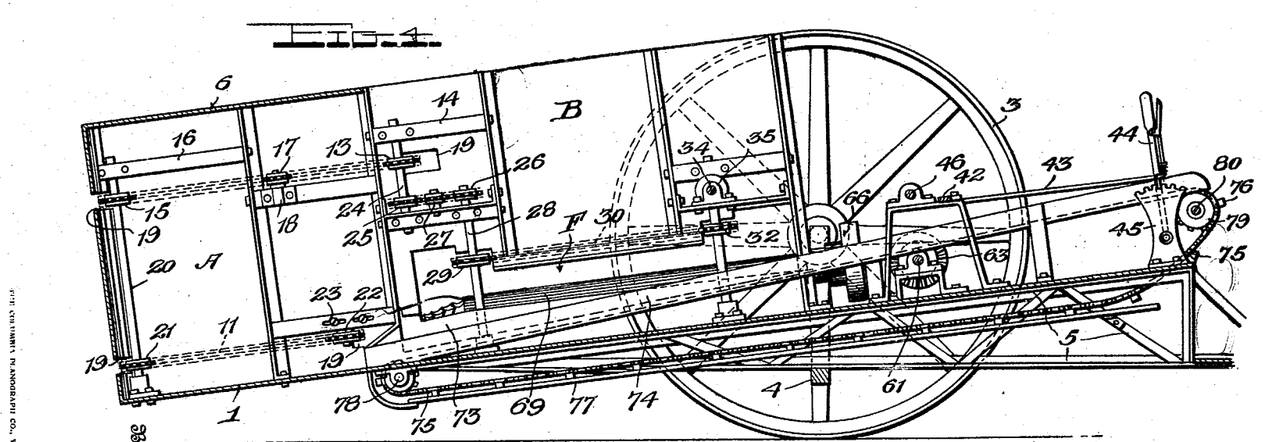
Fig. 4 illustrates a longitudinal section of the machine, on the line X—X of Fig. 2.
Figure 5:
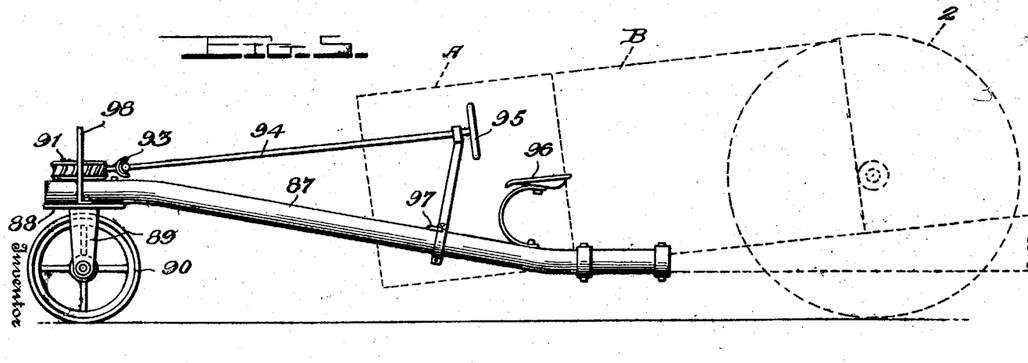
Fig. 5 is an elevation of Fig. 3, showing a diagrammatical view of the entire machine, but without the bagging and cleaning device.
Figure 6:
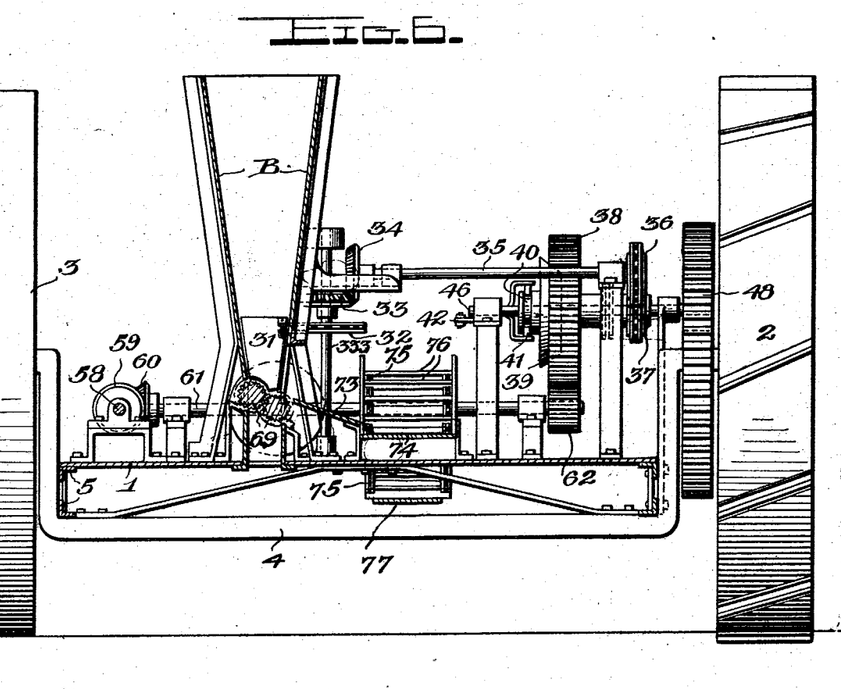
Fig. 6 illustrates a cross section, drawn to a larger scale, of the entire machine, on the line Y—Y of Fig. 2.
Figure 7:
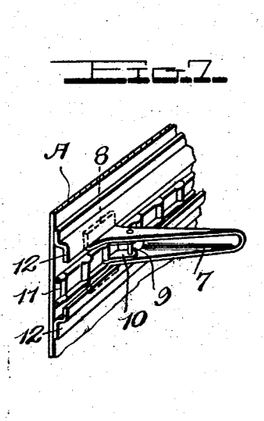
Fig. 7 shows a detail view of part of one of the stalk feeding chains with its corresponding paddle.

On the same side of the underframe is also mounted the beam 87, by means of suitable clamps, the fore end of the beam being bent upward, as shown in Fig. 5, and to the lower side of said end is secured a crown piece 88 through which passes the spindle of a forked bracket 89 in which is mounted the steering wheel 90. Said steering wheel is constructed of considerable width and with a throat on its tread in order to adapt the wheel to ride on the ridge of the furrow and thereby preventing the wheel to a certain extent from changing its direction of travel. On the fore end of the beam 87 and formed integral with the spindle of the forked support 89 which carries the steering wheel, is mounted a worm wheel 91 which meshes with a worm 92, jointed at 93 to the operating rod 94 which carries the hand wheel 95. Said wheel with its rod is mounted to turn in a support arranged on the supporting rod 97 affixed to the beam. On the beam is also mounted a suitable seat 96 for the driver. A transverse rod 98, formed at its ends with suitable forks and mounted on the spindle of the steering wheel, allows of the passage of the traces and so prevents the same from entangling with the worm or with the parts used for regulating the movements of the steering wheel.

Having described the construction and arrangement of the parts which constitute the apparatus, I shall now proceed to explain its operation:

The machine is transported to the field where it is to harvest and husk the corn, with the parts of the sleeve coupling on the shaft 46 in their uncoupled position, so that the driving wheel will only operate as a road wheel. Traction may be effected by a team of animals or by a mechanical tractor or otherwise, as may be desired and the line of traction will be regulated by means of the holes of the bar 85 and by operating the steering wheel 90 by the hand wheel 95, in the manner above set forth. After arriving on the field, the machine is placed so that one of the furrows of plants will be positioned in front of the feed inlet or entrance formed by the two walls A, Figs. 1 and 11, whereupon the operative parts of the machine are coupled on by means of the lever 44 and the operation is started.

As the machine inclines in a forward and downward direction, the lower part of the inlet or entrance will be situated at a small distance above the surface of the soil, so that no plant, situated within the range of said entrance, will escape from the action of the machine. As the machine advances, the chains 11 move toward the rear of the entrance or hopper, being driven by the sprockets and gears before described from the gear 60 and the sprocket 37 and the maize plants will be caught by the feeding arms or paddles 7 and pushed along thereby to the end of the husking rollers 69. The gears for transmitting this movement, are so timed that the motion of the said chains will be somewhat quicker than the forward motion of the machine, for the purpose of permitting of the arms or paddles to seize certain plants, as for instance the stalks $a'$ in Fig. 11, which as will be noted, are inclined in a forward direction, and to turn the same over on the husking rollers, an action which would not take place if the speed of said chains were equal to or less than that of the forward motion of the machine. When arriving at the lower end of the husking rollers or vertex of the conical part 70, the plants will be caught between both rollers which rotate in opposite directions and while the cobs are stripped and detached from the stalks, these latter escape from between the rollers at the rear end thereof and fall down by their own weight, such action being assisted by the direction of rotation of said husking and stripping rollers.

Simultaneously, with the forward motion of the machine and being driven from the same sprocket 37, the chains 30 cause the operation of the cleaning paddles 31, supported thereby. Said paddles complete the work effected by the husking rollers in the cases where for any reason said rollers should not have operated to their full extent, by separating the cobs from their stalks and clearing, at any event, the upper surfaces of the said rollers from any cobs which might not yet have fallen on the bottom of the cob elevator by the chute 73. As said cleaning paddles 31 extend to the upper operative part of the husking rollers and operate on the same to their full length, limited at said upper part by a curved surface which corresponds in direction with the movement of the cobs, each of said paddles 31 leaves behind itself an entirely clean surface of the rollers, thereby obtaining the double purpose of avoiding, in the first place, any choking tendencies at the husking rollers and the consecutive obstructions in the operation of the machine, and, in the second place, the detached cobs are immediately obliged to pass to the cob elevator 74 for further treatment.

The cobs, after being detached from their stalks, slide along the inclined chute 73, to the bottom of the elevator 74 which, as already stated, is placed at a lower level than said husking rollers 69. Here, the cobs are seized by the cross battens 76 and carried to the upper end of the elevator by the operation of the sprocket 83, chain 82, sprocket 81 and the sprockets 79 and 78 which drive the endless chains 75 to which are secured the said battens 76. The speed of motion of the elevator chains is also timed by suitably adjusting the drives, that the cobs will be prevented from excessively accumulating in the elevator and the rate of the conveyance thereof will approximately correspond with the speed of operation of the husking rollers 69. The cobs are discharged from the upper part of the elevator on the chute 142, at the base of the elevator 132 which conveys the cobs to the upper edge of the reciprocating box and finally discharges them on the screen 128. Reciprocal motion is imparted to the box by means of the links 124 to a limited extent, so as to substantially submit the box to a suitable vibration, while at the same time submitting the cobs to the action of the air blast directed by the blower against the lower surface of the screen. Any loose grains discharged thereon, will pass through the screen and fall on the bottom of the box from which they will be discharged by means of the channel or duct 129 into the corresponding bag. The cobs, after being cleaned from dust or other foreign matter, will slide over the inclined surface of the screen 128 and fall from the free edge of the same into the respective lower compartment of the box 115, from which they will be discharged by means of the duct or channel 130 in a clean condition into the corresponding bag.

When arriving at the end of the furrow, or of the field, the machine is made to turn, this operation being performed with the aid of the steering wheel and the traces, after having disengaged the operative parts of the harvesting devices of the machine, by operation of the hand lever 44. When the machine has arrived in front of a fresh furrow, the said lever 44 is operated to couple the drives on and the operation is repeated till harvesting is finished.

From the foregoing description it will be seen that for the complete operation of the machine, only two operators are required, one, the driver, for attending to the team traces and the steering wheel 90, and the other for dealing with the bagging devices and for operating, when required, the lever 44 for coupling or uncoupling the operative parts of the harvester.

The advantages offered by the machine in accordance with this invention over those already known, will readily be appreciated, for, besides the fact that it only requires two attendants for operating which is a matter of no little importance in view of the ever increasing cost of manual labor during the harvesting season, it must be taken into account that the harvesting operation may by means of this machine be performed mechanically, at a considerable rate of speed and in a thoroughly satisfactory manner, and, above all, that in connection with the operation of this machine no difficulties are encountered, such as the choking of the operative parts and similar accidents, most frequently to be observed in connection with the known machines of this description. The cleaning paddles, owing to their particular shape and arrangement, operate in the double sense of clearing the rollers from all cobs and conveying these latter to the cob elevator, an operation which in other known machines has exclusively been intrusted to gravity, and of coöperating with said husking and stripping rollers to separate from their stalks any cobs which for any reason whatever might not have completely detached therefrom, a condition which in other machines would seriously interfere with the regular operation of the same, by causing obstructions or otherwise.

By arranging the feed arms or paddles alternatively on the opposite sides of the entrance or feeding inlet, no plant will be allowed to escape from the action of the husking rollers; thus, for instance, if a set of paddles or arms were arranged on one side only of the inlet opening, some plants might not be fed to the husking rollers with the necessary degree of incline, or some plants, moving along the opposite side of the said entrance, might even entirely escape from being treated, while, if the paddles were arranged those of one side in opposition to those of the other side, the plants, on being set free by both paddles or arms at the same time when turning on the sprockets and entering into the openings 19,—might recede by their own resiliency from the husking rollers, thereby interfering with the satisfactory working of the machine. Another factor of the successful operation of the machine resides also, as stated before, in the difference of speed between the motion of the chains 11 and the forward motion of the harvesting machine, obtained in the manner above explained.

While the machine in accordance with this invention has been described and shown as being provided with a particular arrangement of driving gears for the operation of its parts, it should be understood that such arrangement only is to be considered as an example and as one of a number of driving systems which might be employed, and it will be evident that any other suitable form or arrangement of driving gears might be used and that into the said machine all or any such changes or modifications of arrangement or details of construction may be introduced as do not depart from the limits of this invention, as clearly determined in the following claims.

I declare that what I claim as new and desire to secure by Letters Patent, is:

1. In a harvesting machine, the combination of a frame provided at its front with an inlet passage; supporting wheels for said frame including a single driving wheel; a chain arranged at each side of the passage and provided with feeding arms to engage the stalks; a longitudinal shaft mounted horizontally in the frame at one side thereof; gearing between the front end of said shaft and the adjacent chain to drive the latter from the former; a transverse horizontal shaft mounted in said frame in rear of the longitudinal shaft; gears connecting the rear end of said longitudinal shaft and the adjacent end of the transverse shaft; gearing connecting the other end of said transverse shaft with the driving wheel; driving connections between said wheel and the other chain; a pair of co-acting husking rolls mounted in the frame in rear of said chains to receive the plants fed thereto by the chains, said rolls being geared together to rotate in unison; and a pair of intermeshing gears connecting one of said rolls with said transverse shaft to be driven thereby.

2. In a harvesting machine, the combination of a frame provided at its front with an inlet passage; supporting wheels for said frame including a single driving wheel; a chain arranged at each side of the passage and provided with feeding arms to engage the stalks, a longitudinal shaft mounted horizontally in the frame at one side thereof gearing between the front end of said shaft and the adjacent chain to drive the latter from the former; a transverse, horizontal shaft mounted in said frame in rear of the longitudinal shaft; gears connecting the rear end of said longitudinal shaft and the adjacent end of the horizontal shaft; gearing connecting the other end of said horizontal shaft with the driving wheel; a second transverse, horizontal shaft mounted in the opposite side of the frame from the longitudinal shaft; driving connections between the driving wheel and the second horizontal shaft; a vertical shaft geared to said second horizontal shaft to be driven by the same; gearing connecting the vertical shaft and the other chain; a pair of co-acting husking rolls mounted in the frame in rear of said chains to receive the plants fed thereto by the chains, said rolls being geared together to rotate in unison; and a pair of intermeshing gears connecting one of said rolls with the first transverse shaft to be driven thereby.

3. In a harvesting machine, the combination of a frame provided at its front with an inlet passage; supporting wheels for said frame including a driving wheel; a feeding chain arranged at each side of the passage; a pair of co-acting husking rolls mounted in the frame in rear of said chains to receive the plants fed thereto by the chains; means for driving said rolls in unison; a chain, separate from said feeding chains, disposed above said rolls and provided with a cleaning device adapted to travel along said rolls; driving connections between the driving wheel and the cleaning chain; means for transmitting the movement of said cleaning chain to the adjacent feeding chain to drive the latter from the former; and separate driving connections between said driving wheel and the other feeding chain.

4. In a harvesting machine, the combination of a frame provided at its front with an inlet passage; supporting wheels for said frame including a driving wheel; a feeding chain arranged at each side of the passage; a pair of co-acting husking rolls mounted in the frame in rear of said chains to receive the plants fed thereto by the chains; means for driving said rolls in unison; a chain, separate from said feeding chains, disposed above said rolls and provided with a cleaning device disposed transversely of said rolls and adapted to travel along the same with its lower edge in peripheral contact therewith, said device having a portion of its said edge projecting between said rolls; driving connections between the driving wheel and the cleaning chain; means for transmitting the movement of said cleaning chain to the adjacent feeding chain to drive the latter from the former; and separate driving connections between said driving wheel and the other feeding chain.

5. In a harvesting machine, the combination of a frame provided at its front with an inlet passage; supporting wheels for said frame including a driving wheel; a chain arranged at each side of the passage and provided with feeding arms to engage the stalks; a longitudinal shaft mounted in the frame at one side thereof; gearing between the front end of said shaft and the adjacent chain to drive the latter from the former; a cross shaft mounted in said frame in rear of the longitudinal shaft; gears connecting the rear end of said longitudinal shaft and the adjacent end of the cross shaft; gearing connecting the other end of said cross shaft with the driving wheel; a pair of co-acting husking rolls mounted in the frame in rear of said chains to receive the plants fed thereto by the chains, said rolls being geared together to rotate in unison; a pair of intermeshing gears connecting one of said rolls with the cross shaft to be driven thereby; a chain, separate from the feeding chains, disposed above said rolls and provided with a cleaning device adapted to travel along said rolls; driving connections between said cleaning chain and the other feeding chain; and means for driving said cleaning chain from said driving wheel.

In testimony whereof I affix my signature.

JOSÉ CARBÓ.

Copies of this patent may be obtained for five cents each, by addressing the "Commissioner of Patents, Washington, D. C."